US012785320B2

(12) United States Patent
Bogart et al.

(10) Patent No.: US 12,785,320 B2
(45) Date of Patent: Nov. 3, 2026

(54) CONNECTOR FOR A DC VOLTAGE CONNECTION TO A PLATFORM

(71) Applicants: Rosendin Electric, Inc., San Jose, CA (US); Monroe Integro LLC, New Britain, CT (US)

(72) Inventors: John Bogart, Plainville, CT (US); Paul Kish, New Britain, CT (US); Adam Greenman, West Hartford, CT (US); Richard Joseph Hackely, Sugar Land, TX (US); Shawn Hanff, Longmont, CO (US); Steve Eichelberger, Bay City, TX (US)

(73) Assignee: Rosendin Electric, Inc., San Jose, CA (US)

(*) Notice: Subject to any disclaimer, the term of this patent is extended or adjusted under 35 U.S.C. 154(b) by 429 days.

(21) Appl. No.: 18/232,753

(22) Filed: Aug. 10, 2023

(65) Prior Publication Data

US 2024/0055796 A1 Feb. 15, 2024

Related U.S. Application Data

(60) Provisional application No. 63/397,256, filed on Aug. 11, 2022.

(51) Int. Cl.
*H01R 13/52* (2006.01)
*H01R 13/58* (2006.01)
*H01R 43/24* (2006.01)

(52) U.S. Cl.
CPC ..... *H01R 13/5205* (2013.01); *H01R 13/5845* (2013.01); *H01R 43/24* (2013.01)

(58) Field of Classification Search
CPC ....................... H01R 13/5205; H01R 13/5845; H01R 43/24; H01R 4/70; H01R 11/09; H01R 4/36
See application file for complete search history.

(56) References Cited

U.S. PATENT DOCUMENTS

2016/0079717 A1* 3/2016 Bogart .................. H01R 13/58 439/620.21
2025/0132724 A1* 4/2025 Ge ...................... H02G 11/006

* cited by examiner

*Primary Examiner* — Joseph Ortega
(74) *Attorney, Agent, or Firm* — Rutan and Tucker, LLP

(57) ABSTRACT

A connector for a DC voltage connection to a platform can have i) a first over-mold section for a panel mount and ii) a sealing boot with a second over-mold section. The first over-mold section for the panel mount encases a portion of a first cable and a first section of a shear bolt connector to form a panel mount receptacle. The second over-mold section of the sealing boot encases a portion of a second cable and a second section of the shear bolt connector. The second over-mold section can have a shape and size to slidably fit over the first over-mold section to form a mechanically locked, watertight assembly that covers the shear bolt connector in its entirety and the portions of the first cable and the second cable that are electrically coupled inside the shear bolt connector.

20 Claims, 13 Drawing Sheets

Assembled second over-mold section with the first over-mold section to cover the shear bolt connector and the portions of the first cable and the second cable

CONNECTOR FOR A DC VOLTAGE CONNECTION TO A PLATFORM

CROSS-REFERENCE

This application claims priority under 35 USC 119 to U.S. provisional patent application Ser. 63/397,256, titled "CONNECTOR FOR A DC VOLTAGE CONNECTION TO A PLATFORM," filed Aug. 11, 2022, which the disclosure of such is incorporated herein by reference in its entirety.

FIELD

Embodiments of the design provided herein generally relate to a connector for a DC voltage connection to a platform. In an embodiment, a shear bolt connector and a sealing boot are applied to improve the connector system.

BACKGROUND

Existing methods for connecting a solar electrical inverter to a DC feed include directly connecting hard wires into an electrical inverter using lugs, for example, on 350 to 750 MCM Cables. The MCM cables carry DC energy from the rows to the distribution boxes and then to the electrical inverter. However, these connecting methods have several disadvantages. First, the connection process is very time consuming. Second, the connection process requires multiple personnel to be performed. Third, the personnel usually must be especially trained and very skilled to do the job. And fourth, in order to connect/disconnect the DC feed to the electrical inverter, the electrical inverter needs to be open, which would void the warranty and cause warranty issues down the road. Therefore, there is a need for a quick connection method without a need for specially trained personnel and without causing warranty issues.

SUMMARY

In an embodiment, a connector for a DC voltage connection to a platform can have i) a first over-mold section for a panel mount and ii) a second over-mold section for a sealing boot. The first over-mold section for the panel mount encases a portion of a first cable and a first section of a shear bolt connector to form a panel mount receptacle. Note, the first cable can be electrically connected to an electrical inverter. The second over-mold section of the sealing boot encases a portion of a second cable and a second section of the shear bolt connector. The second cable can be electrically connected to a DC voltage feed to be supplied to the electrical inverter. The second over-mold section can have a shape and size to slidably fit over the first over-mold section to form a mechanically locked, watertight assembly that covers the shear bolt connector in its entirety and the portions of the first cable and the second cable that are electrically coupled inside the shear bolt connector.

DRAWINGS

The drawings refer to some embodiments of the design provided herein.

Figure 10A:
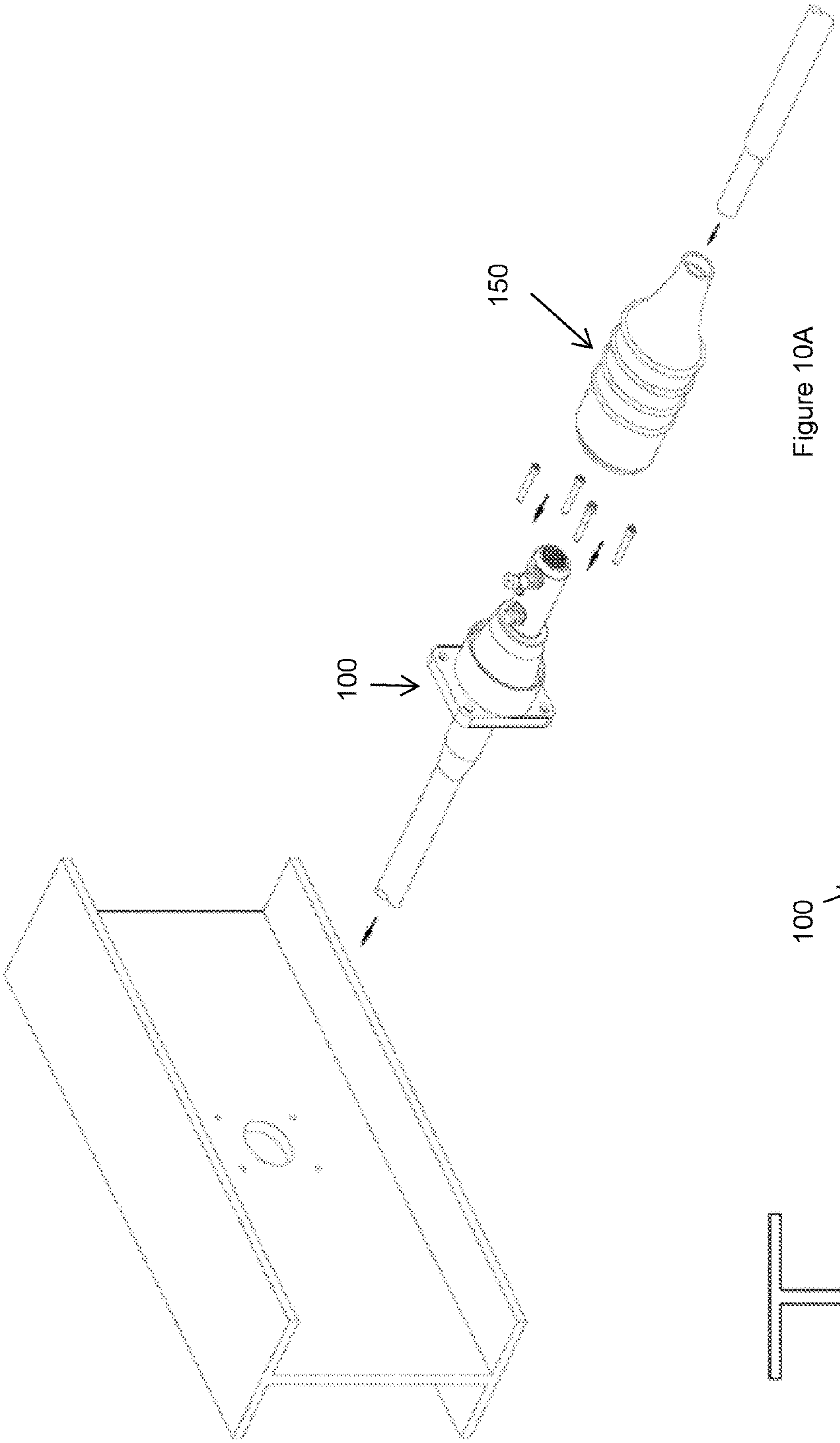

FIG. 10A illustrates a perspective view diagram of an exploded view of an embodiment of an example second over-mold section that has a shape and size to slidably fit over the example first over-mold section to form a mechanically locked, watertight assembly that covers the shear bolt connector in its entirety and the portions of the first cable and the second cables that are electrically coupled inside the shear bolt connector.

Figure 10B:
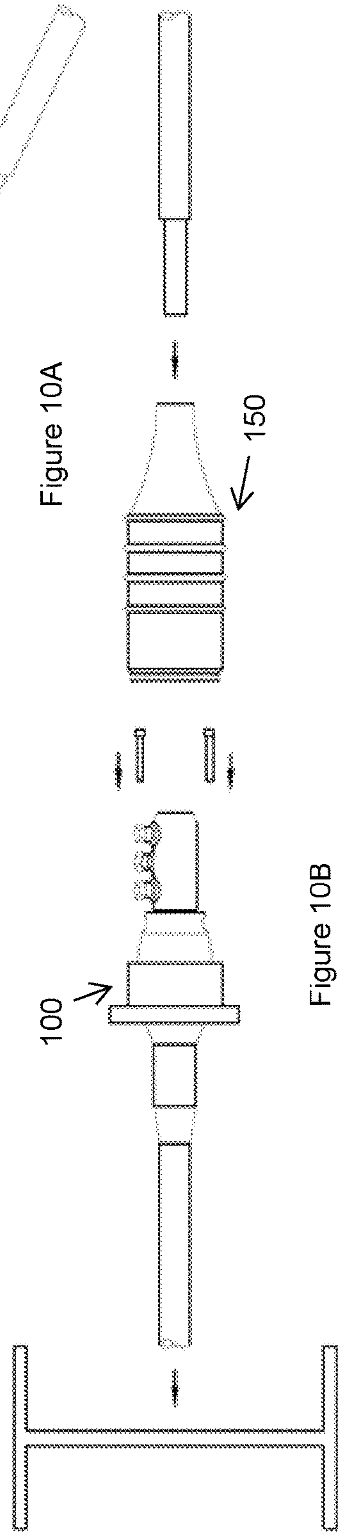

FIG. 10B illustrates a side view diagram of an exploded view of an embodiment of an example second over-mold section that has a shape and size to slidably fit over the example first over-mold section to form a mechanically locked, watertight assembly.

Figure 11A:
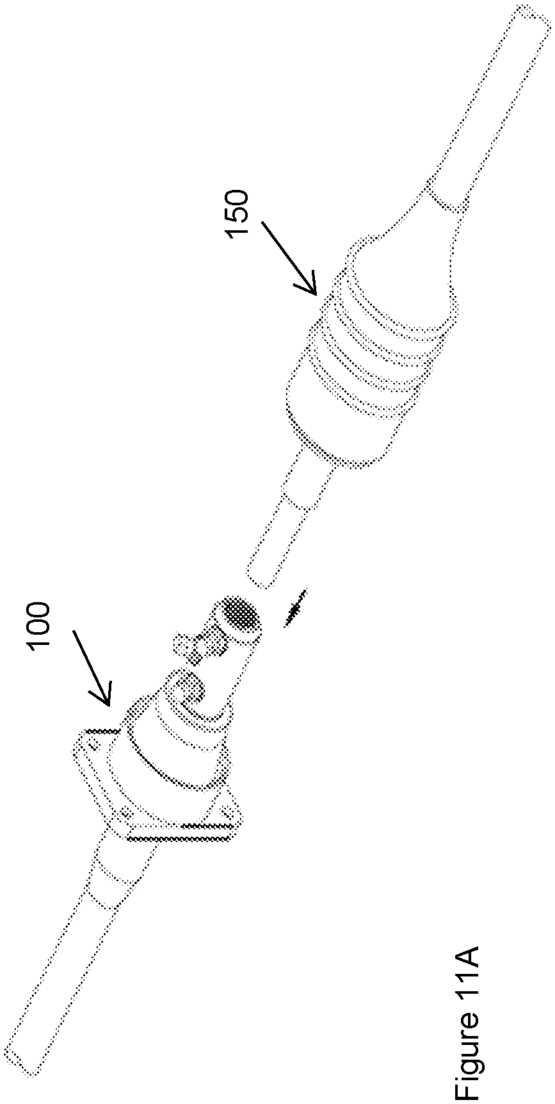

FIG. 11A illustrates a perspective view diagram of an embodiment of an example second over-mold section of the sealing boot encasing portion of the second cable about to be assembled into the shear bolt connector and the first over-mold section for a panel mount.

Figure 11B:
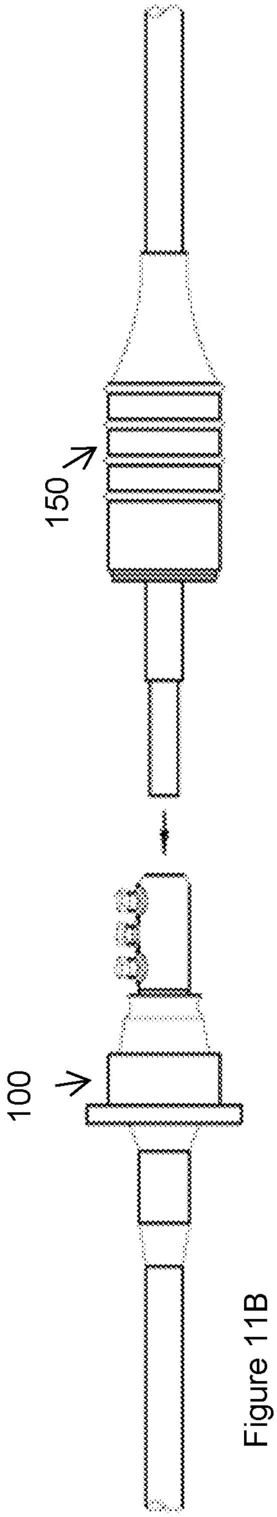

FIG. 11B illustrates a side view diagram of an embodiment of an example second over-mold section of the sealing boot encasing portion of the second cable about to be assembled into the shear bolt connector and the first over-mold section for a panel mount.

Figure 12A:
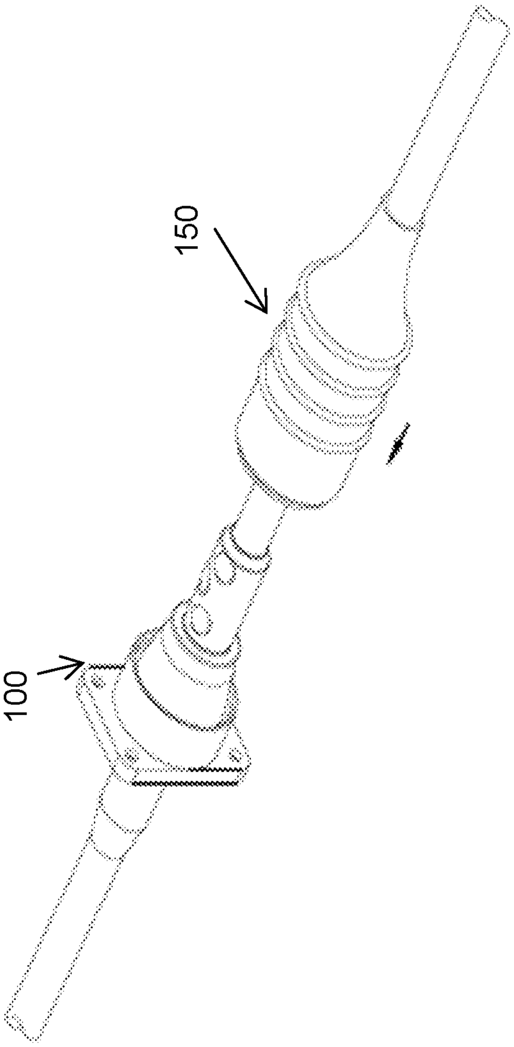

FIG. 12A illustrates a perspective view diagram of an embodiment of an example second over-mold section of the sealing boot with a portion of the second cable assembled into the shear bolt connector and the first over-mold section for a panel mount.

Figure 12B:
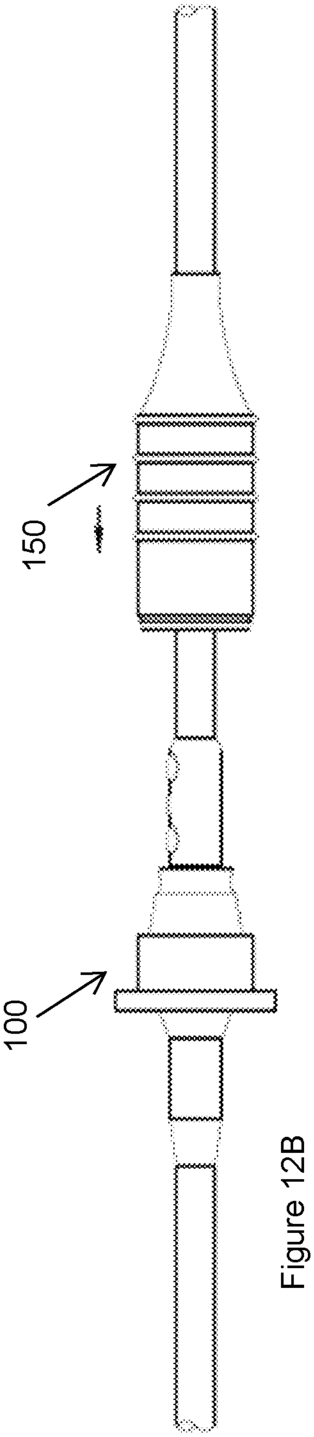

FIG. 12B illustrates a side view diagram of an embodiment of an example second over-mold section of the sealing boot with a portion of the second cable assembled into the shear bolt connector and the first over-mold section for a panel mount.

Figure 13:
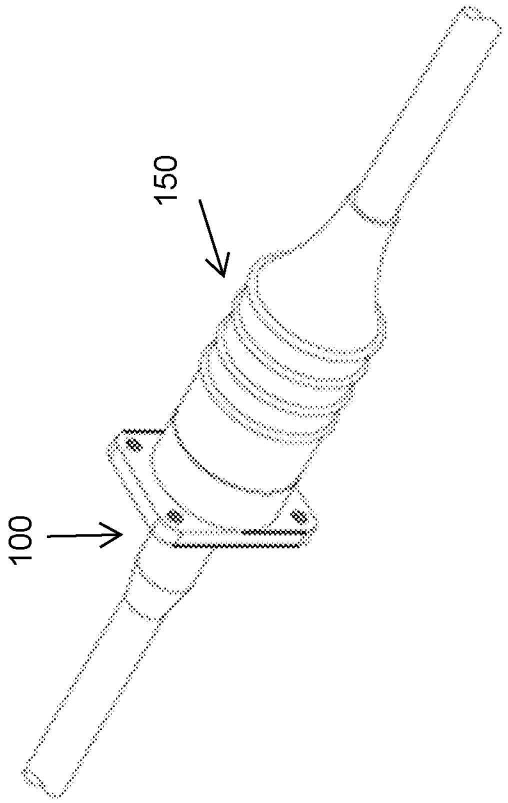

FIG. 13 illustrates a perspective view diagram of an embodiment of an example second over-mold section of the sealing boot mechanically locked with the first over-mold section.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, connections, amount of emergency power supplies, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further specific numeric references such as first enclosure, may be made. However, the specific numeric reference should not be interpreted as a literal sequential order but rather interpreted that the first enclosure is different than a second enclosure. Thus, the specific details set forth are merely exemplary. The specific details may be varied from and still be contemplated to be within the spirit and scope of the present invention.

A connector for a DC voltage connection to a platform and a method for installing such a connector are disclosed. The disclosed method allows the DC feed to be plugged into the electrical inverter using a panel mount receptacle on the electrical inverter, a mating male connector on a cable, and then a shear bolt connector on the other end. This method of installing/connecting the electrical inverter can enhance safety, allow the electrical inverter to be serviceable, eliminate the need to build out costly infrastructure, save time in the labour of installation, etc. The method for connecting the connector for a DC voltage connection to a platform further can introduce a "plug and play" to the installation of an electrical inverter. Unlike current methods which heavily rely on hard wiring with using lugs, the disclosed method uses a shear bolt connector covered by a sealing boot to connect the DC feed to the electrical inverter. To that end, the method for connecting the connector for a DC voltage connection to the platform discloses using heavy duty, permanently molded connectors, and a panel mount receptacle for positive lock on installation/connection. The connector for the DC voltage connection to a platform can have i) a first over-mold section for a panel mount and ii) a second over-mold section for a sealing boot.

It should be noted that, the disclosed method and apparatus are not restricted to an electrical inverter on a solar array and can be extended to any outdoor electrical power feed connection.

Figure 1:
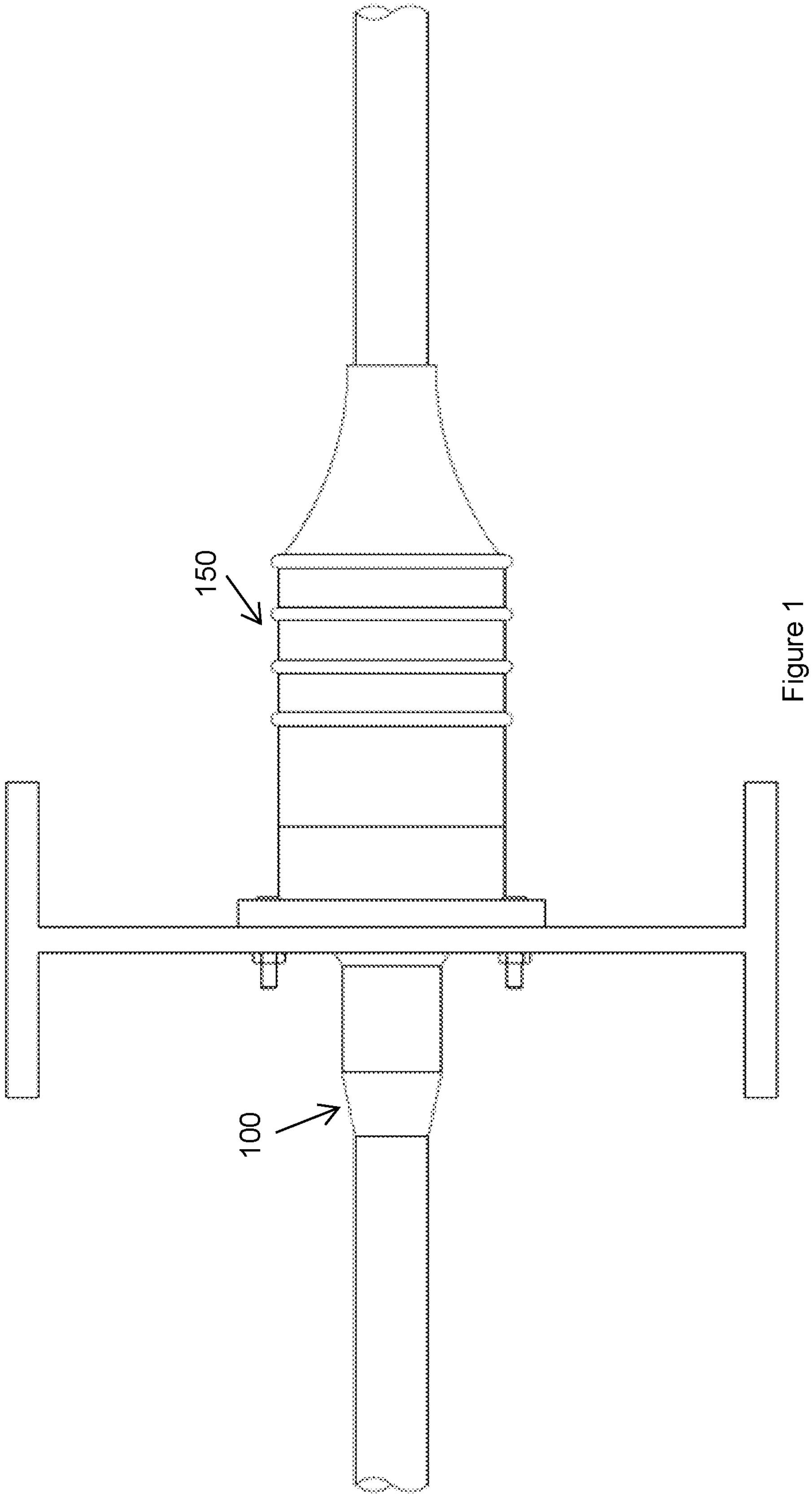
FIG. 1 illustrates a side view diagram of an embodiment of an example assembled second over-mold section with the first over-mold section to cover the shear bolt connector and the portions of the first cable and the second cable.

FIG. 1 illustrates a side view diagram of an embodiment of an example assembled second over-mold section with the first over-mold section to cover the shear bolt connector and the portions of the first cable and the second cable. The connector for the DC voltage connection to a platform can have i) a first over-mold section 100 for a panel mount 300 (see FIGS. 6 & 10A) and ii) a second over-mold section 150 for a sealing boot 160.

Figure 2:
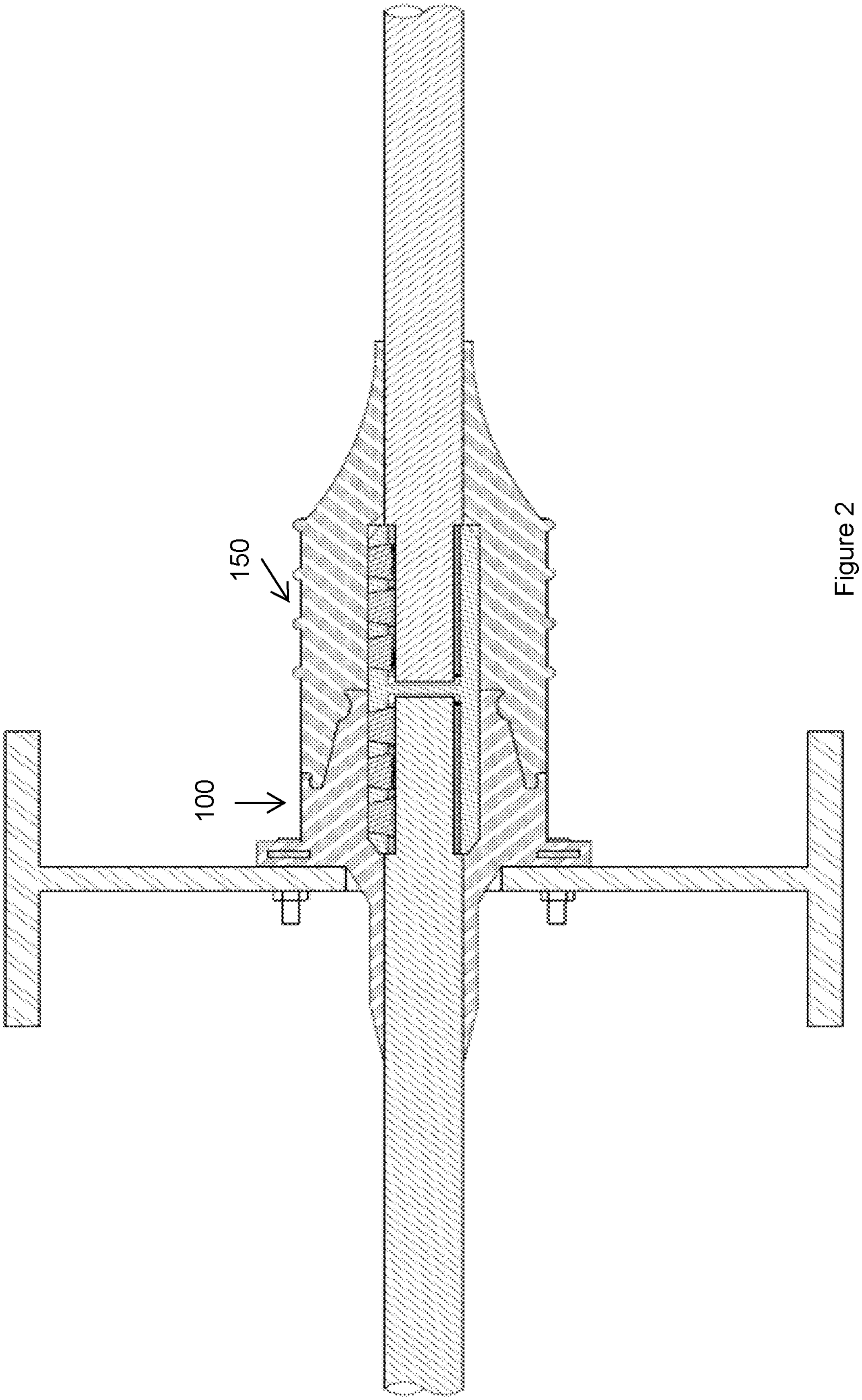
FIG. 2 illustrates a cross-sectional view of the internal portions of an embodiment of an example assembled second over-mold section with the first over-mold section to cover the shear bolt connector and the portions of the first cable and the second cable.

The connector for a DC voltage connection to a platform can include a first cable 120 connected to the electrical inverter, a second over-mold section 150 with the first over-mold section 100 to cover a shear bolt connector 200 and the portions of the first cable and a second cable 120, where the shear bolt connector 200 connects both ends of the first cable 110 and the second cable 120 from the DC voltage feed as shown in FIG. 2. The second over-mold section 150 of the sealing boot 160 covers the first cable 110 and the second cable 120 over where they electrically couple in the shear bolt connector. The first cable 110 and/or second cable 120, each may be a single strand of wire or multiple strands of wire. The second over-mold section 150 with the first over-mold section 100 may form the connector for a DC voltage connection.

Figure 4:
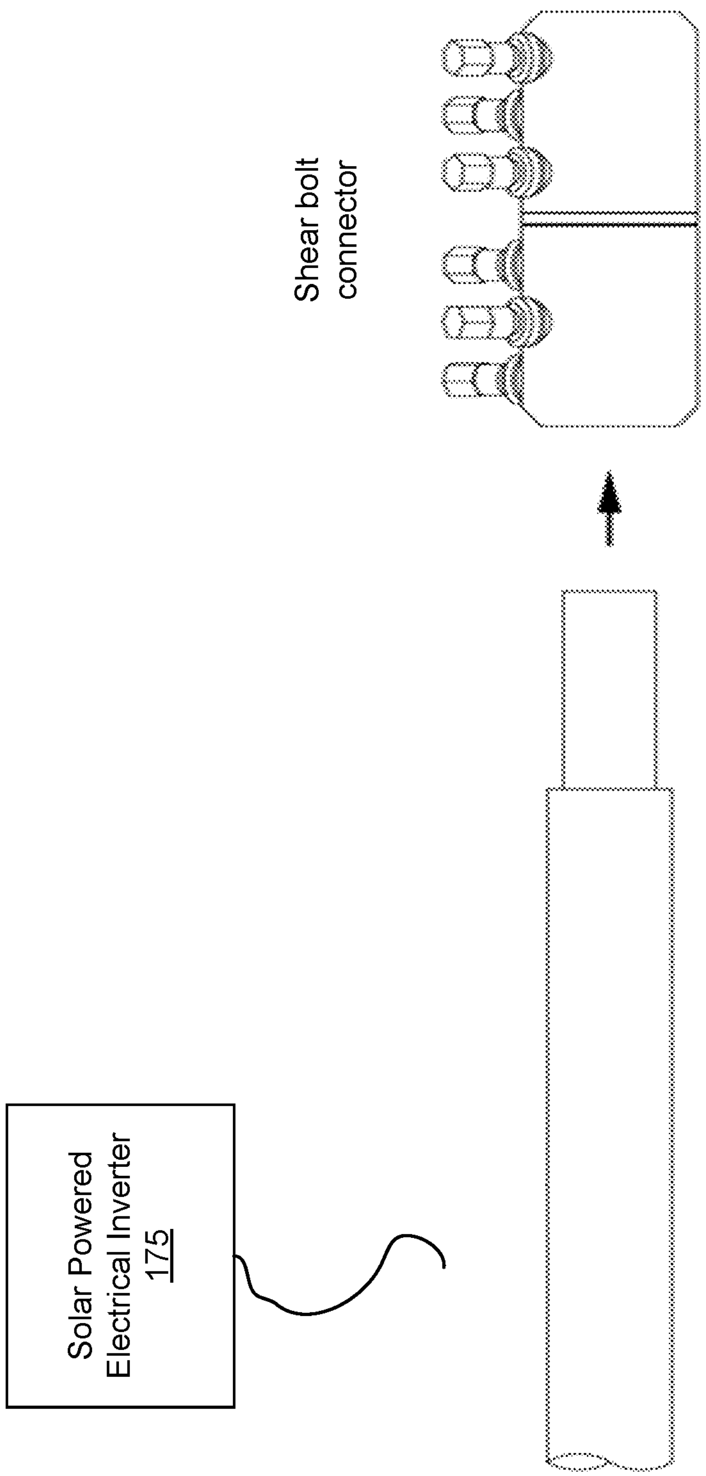
FIG. 4 illustrates a side view diagram of an embodiment of an example first cable coming from an example solar powered electrical inverter and a shear bolt connector.

To install the connector for a DC voltage connection to a platform, the first cable can be connected to the shear bolt connector 200. (See FIG. 4) FIG. 4 illustrates a side view diagram of an embodiment of an example first cable 110 coming from an example solar powered electrical inverter 175 and the a shear bolt connector 200. The first cable 110 may be directly attached to the electrical inverter box. It should be noted that as a result of the present method for connecting the connector for a DC voltage connection to a platform with the first and second over-mold sections 100/150, the electrical inverter box and the electrical inverter, such as a solar powered electrical inverter 175, need not be attached to the shear bolt connector 200 and/or other elements of the system for connecting the connector for a DC voltage connection to a platform. In fact, the electrical inverter can be located several feet away from the shear bolt connector and the second cable. The first and second cables 110 and 120 can be electrically connected to each other via the shear bolt connector 200 and then be 'mounted on'/'mechanically secured to' a metal frame away from the electrical inverter itself. For example, the electrical inverter box can be located six feet away from the metal frame. (See the I-beam in FIG. 1 the first over-mold section 100 is secured to). The first cable 110 coming out of the electrical inverter can be installed by an electrical inverter manufacturer.

FIG. 2 illustrates a cross-sectional view of the internal portions of an embodiment of an example assembled second over-mold section 150 with the first over-mold section 100 to cover the shear bolt connector 200 and the portions of the first cable 110 and the second cable 120.

Figure 3:
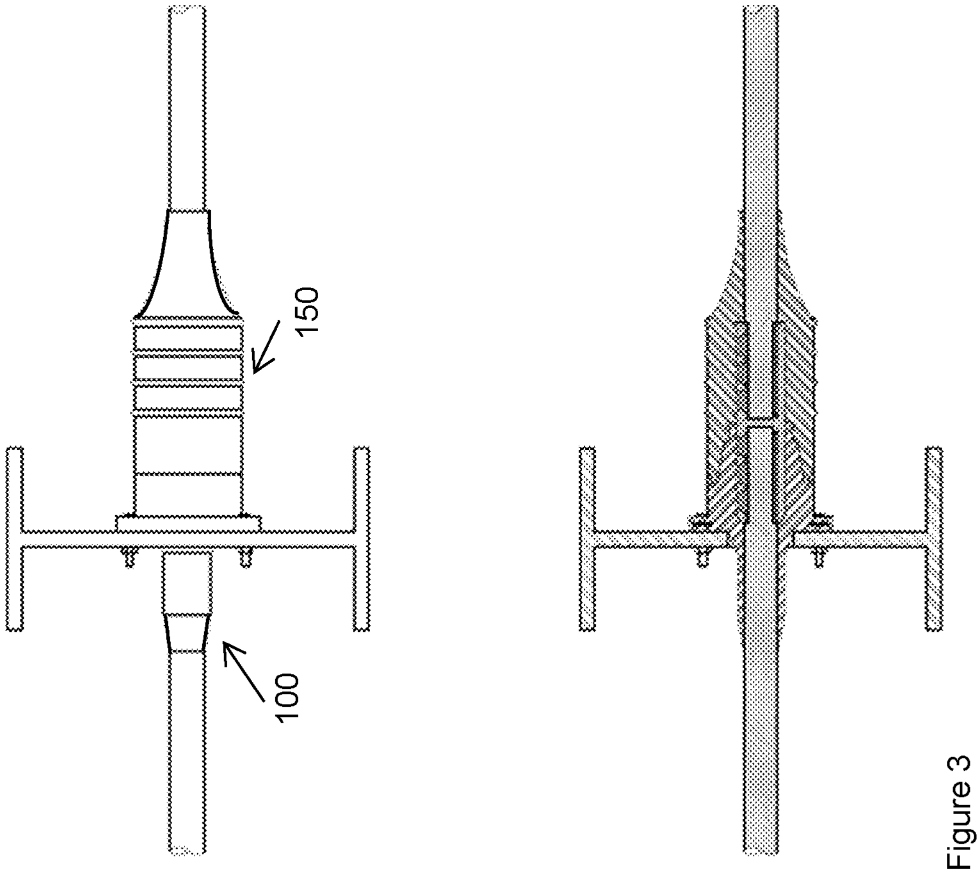
FIG. 3 illustrates a side by side view of the example assembled second over-mold section with the first over-mold section showing the external portions and the internal portions from FIGS. 1 and 2.
Figure 5:
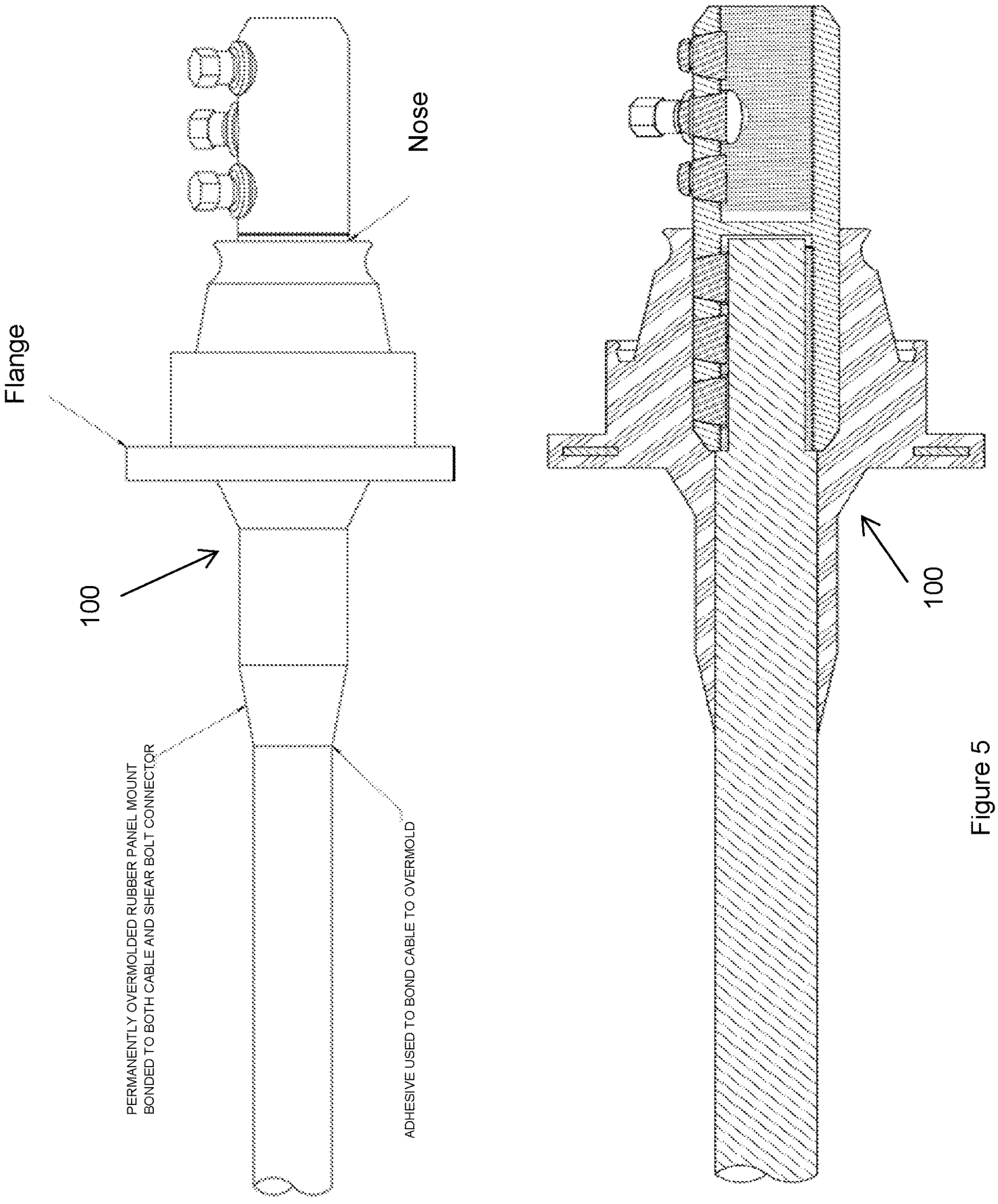
FIG. 5 illustrates a side by side view of external portions and internal portions of an example first over-mold section for a panel mount.

FIG. 3 illustrates a side by side view of the example assembled second over-mold section with the first over-mold section showing the external portions and the internal portions from FIGS. 1 and 2. FIG. 5 illustrates a side by side view of external portions and a cross section internal view of the example first over-mold section for a panel mount. The first over-mold section 100 for the panel mount has a hollow interior in order to slide over the first cable coming from the electrical inverter when being installed and then slide back over the first cable and the first section of the shear bolt connector connection 200 after they have been mechanically and electrically secure together. As shown in the drawings, the first over-mold section 100 for the panel mount can be slide over the first cable coming from the electrical inverter far enough along the length of the first cable to be out of the way for the follow steps. Again, as shown in FIG. 4, the first cable can be inserted into the shear bolt connector. Shear bolts are used to mechanically secure the first cable to the shear bolt connector. The shear bolts are torqued to shear off to permanently mechanically secure the first cable to the shear bolt connector. As shown in FIG. 5, the first over-mold section 100 for the panel mount can then be slid back over the first cable and the first section of the shear bolt connector connection where they mechanically secure together.

Next, as seen in FIG. 5, the first over-mold section 100 of the sealing boot can be bonded to both the insulation of the first cable 110 and the shear bolt connector 200. Weather resistant adhesives can be used to bond the insultation of the first cable to the first over-mold section 100 for the panel mount. On the other side of the first over-mold section 100 for the panel mount weather resistant adhesives can also be used to bond the shear bolt connector inserted into that side of the first over-mold section 100 for the panel mount.

Figure 6:
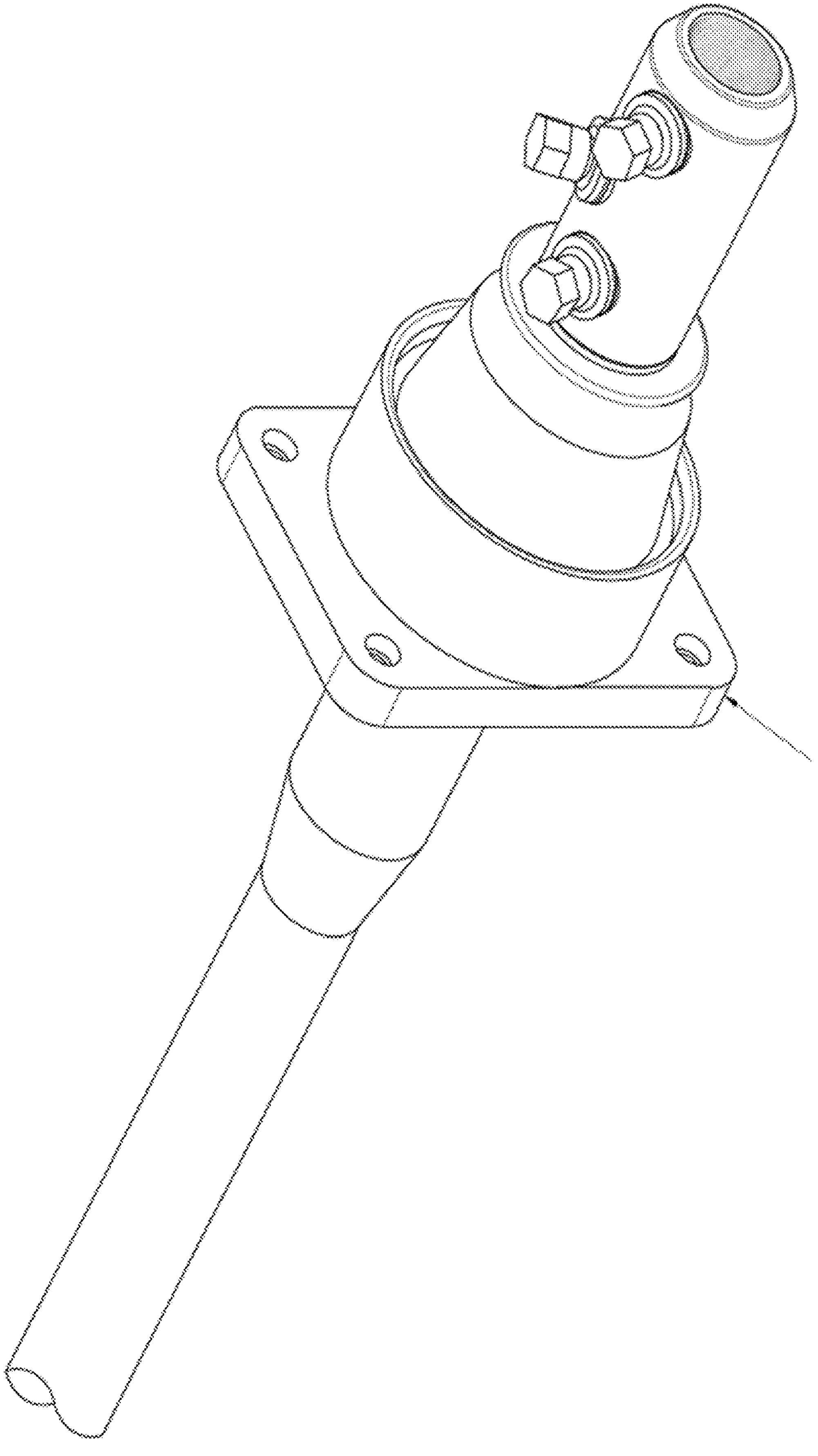
FIG. 6 illustrates a perspective view diagram of an embodiment of an example first over-mold section for a panel mount encasing a portion of a first cable and a first section of a shear bolt connector to form a panel mount receptacle.

FIG. 6 illustrates a perspective view diagram of an embodiment of an example first over-mold section for a panel mount 300 encasing a portion of the a first cable 110 and a first section of the a shear bolt connector 200 to form a panel mount receptacle 310. As assembled, the first over-mold section 100 for the panel mount 300 encases a portion of the first cable and a first section of the shear bolt connector to form the panel mount receptacle 310.

FIG. 10B illustrates a side view diagram of an exploded view of an embodiment of an example second over-mold section that has a shape and size to slidably fit over the example first over-mold section to form a mechanically locked, watertight assembly, where the example first over-mold section is configured to mount to a panel. Again, the panel mount receptacle, from FIGS. 5 and 6, can then be mounted on the metal frame as shown in FIGS. 10A and 10B. For example, the panel mount receptacle can be mounted on the metal frame by using ¼-20 bolts. Unlike current methods which do not include panel mounts, the present method connects the electrical inverter to the steel frame through the first cable and the panel mount receptacle. The first cable is electrically connected to an electrical inverter. Such a connection of the electrical inverter to the metal frame allows connecting/disconnecting the DC voltage feed and the electrical inverter without a need for opening the electrical inverter box which causes warranty issues. Further, the connection of the electrical inverter to the metal frame also allows "a male plug and to female plug" quick connection mechanism, since the first cable can already be pre-wired by the electrical inverter manufacturer to the point of the metal frame. The panel mount can also be pre-wired while already covering the first cable coming out of the electrical inverter box. The first cable can be inserted into and secured to the shear bolt connector via a set of bolts.

Figure 8:
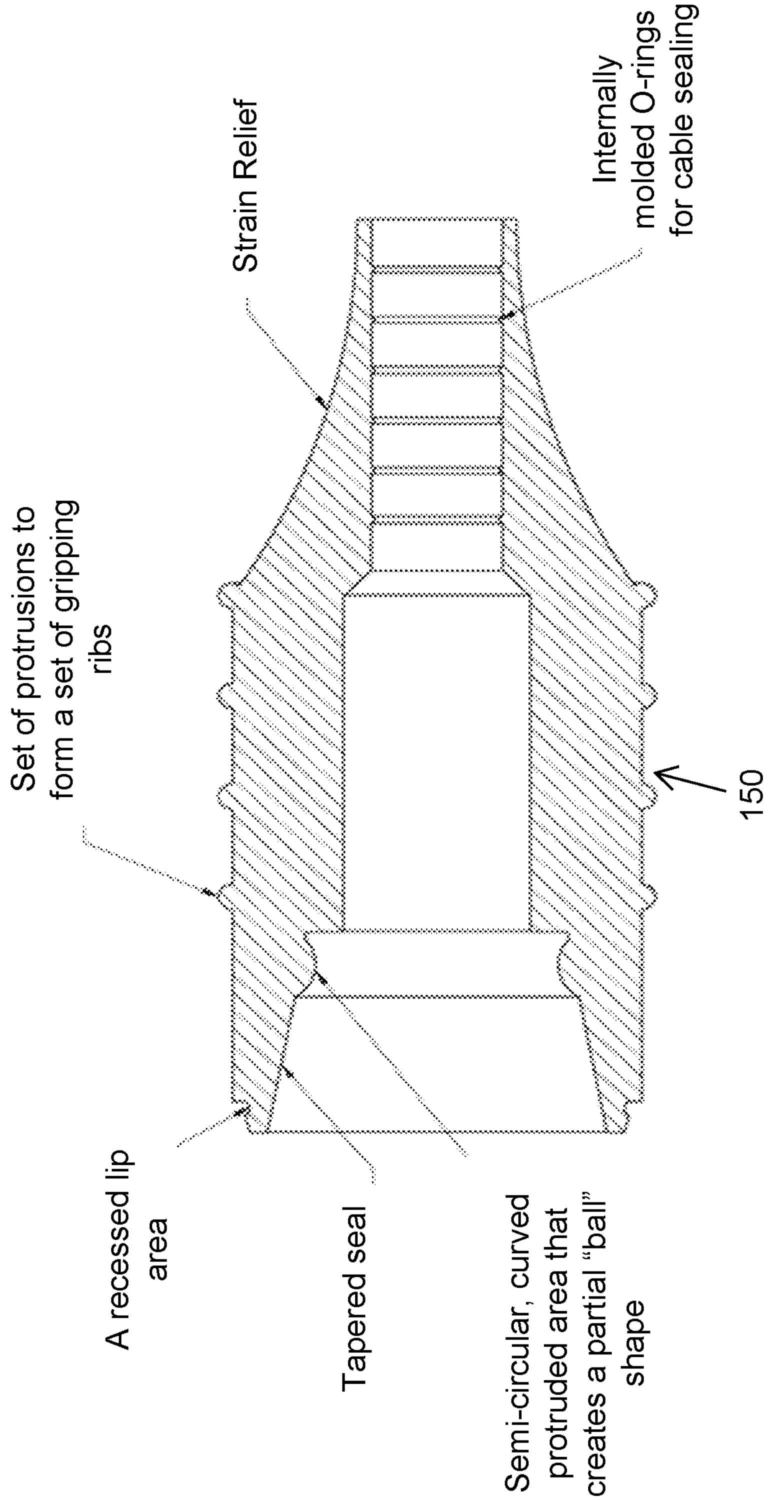
FIG. 8 illustrates a cross-sectional diagram of an embodiment of an example sealing boot with a second over-mold section.

FIG. 8 illustrates a cross-sectional diagram of an embodiment of an example sealing boot with a second over-mold section.

Figure 9A:
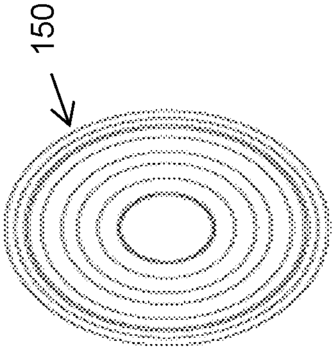
FIG. 9A illustrates a straight-on view diagram of an embodiment of an example sealing boot with a second over-mold section.

FIG. 9A illustrates a straight-on view diagram of an embodiment of an example sealing boot with a second over-mold section.

Figure 9B:
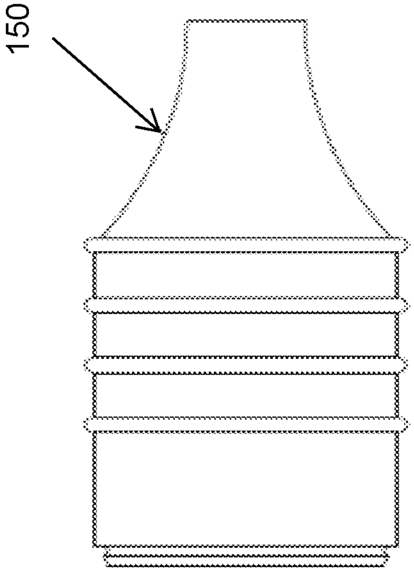
FIG. 9B illustrates a sideview diagram of an embodiment of an example sealing boot with a second over-mold section.

FIG. 9B illustrates a sideview diagram of an embodiment of an example sealing boot with a second over-mold section.

Figure 9C:
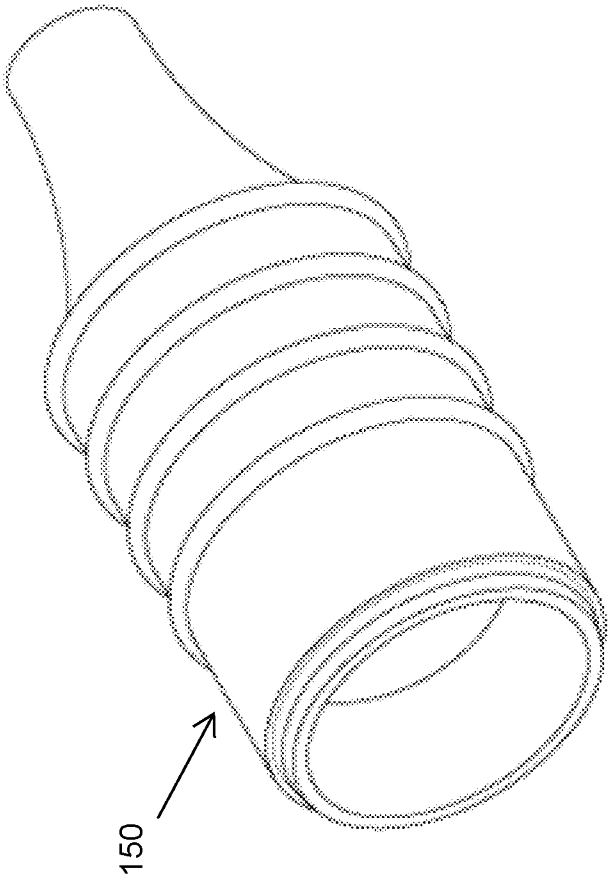
FIG. 9C illustrates a perspective view diagram of an embodiment of an example sealing boot with a second over-mold section.

FIG. 9C illustrates a perspective view diagram of an embodiment of an example sealing boot with a second over-mold section.

The second over-mold section 150 of the sealing boot has a hollow interior in order to slide over the second cable coming from the DC voltage feed when being installed and then slide back over the second cable and the second section of the shear bolt connection after they have been mechanically and electrically secure together.

The second cable is a DC voltage feed such as from a solar array. The goal is to electrically connect the second cable with the first cable with some sort of connectors such as a shear bolt connector, that is mechanically reinforced and protected by the first over-mold section 100 and the second over-mold section 150. (See FIG. 2 for example) In some embodiments, the first cable coming from an electrical inverter is a pre-existing cable provided by the manufacturer of the electrical inverter. The pre-existing cable can be used to connect into the panel mount receptacle section of the connector for a DC voltage connection to a platform and then the second cable of the connector for a DC voltage connection to a platform can be inserted into the shear bolt connector and the sealing boot rubber over-mold can slide over the second cable and the sheer bolt connector onto and be mechanically connected to the panel mount receptacle.

Referring to FIG. 4, the shear bolt connector can include a threaded inside surface to insert the first and second cable. The shear bolt connector can be divided into two separate sections, separated by a thin wall. (See FIG. 4) The first cable can be inserted into the first section in such a way that an end of the first cable is in direct contact with a first side of the thin wall. Similarly, the second cable can be inserted into the second section in such a way that an end of the second cable is in direct contact with a second side of the thin wall. (See FIG. 2) In various embodiments, the first section and the second section of the thin wall are substantially similar in shape and size.

Figure 7:
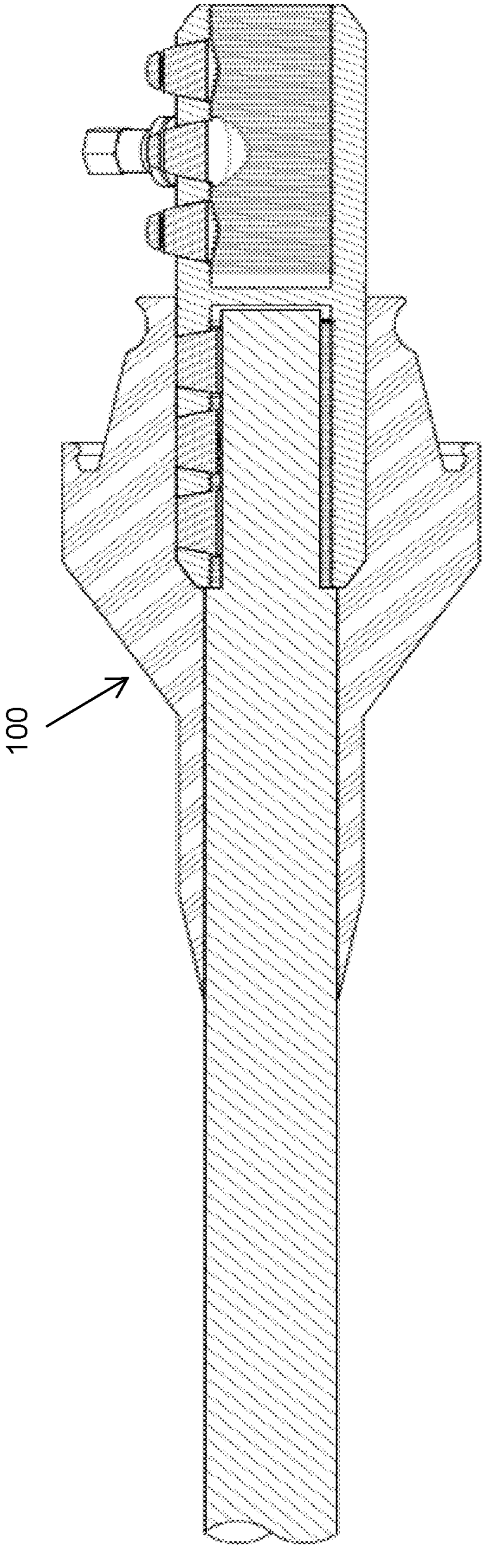
FIG. 7 illustrates a cross-sectional diagram of an embodiment of an example first over-mold section for a panel mount encasing a portion of a first cable and a first section of a shear bolt connector to form a panel mount receptacle.

The shear bolt connector can include a plurality of holes. The holes can extend from an exterior of the shear bolt connector to an interior of the shear bolt connector and can be used to position the bolts. In some embodiments, three bolts are located on the first section of the shear bolt connector. Similarly, in some embodiments, three bolts are located on the second section of the shear bolt connector. Initially, no bolt is placed in the holes. Once the first cable is inserted into the first section of the shear bolt connector and the shear bolt connector is connected to the panel mount receptacle, the first cable is bolted to the shear bolt connector by utilizing the bolts to secure the first cable to the shear bolt connector. In other words, the first cable can be inserted into the shear bolt connector and then the user can tighten the bolts to further secure the first cable inside the shear bolt connector. (See FIG. 7) FIG. 7 illustrates a cross-sectional diagram of an embodiment of an example first over-mold section for a panel mount encasing a portion of a first cable and a first section of a shear bolt connector to form a panel mount receptacle.

Similarly, no bolts are initially placed in the holes of the second section of the shear bolt connector. However, in an embodiment, once the second cable is inserted into the second section of the shear bolt connector, the second cable is then bolted to the shear bolt connector by utilizing the bolts to secure the second cable to the shear bolt connector. In other words, the second cable can be inserted into the shear bolt connector and then the user can install and tighten the bolts to further secure the second cable inside the shear bolt connector. The frame of the shear bolt connector can be made of an electrically conductive material with suitable mechanical and physical properties.

In some embodiments, in order to install the shear bolt connector and the first cable to the panel mount receptacle, a first over-mold section 100 for the panel mount which covers the first section of the shear bolt and the first cable, is secured to the metal frame. See FIG. 10A as a non-limiting example. The first over-mold section 100 for the panel mount has multiple holes in a flange of the first over-mold section 100 (e.g., four holes—one hole in each corner of the flange) that allow bolts to pass through so that the first over-mold section 100 for the panel mount can be bolted to a metal frame to form a panel mount. The sealing boot can include the first over-mold section 100 and the second over-mold section 150. Note, the first and second over-mold section 150 may be made out of one or more UL-approved engineered rubbers.

FIG. 10A illustrates a perspective view diagram of an exploded view of an embodiment of an example second over-mold section that has a shape and size to slidably fit over the example first over-mold section to form a mechanically locked, watertight assembly that covers the shear bolt connector in its entirety and the portions of the first cable and the second cables that are electrically coupled inside the shear bolt connector.

FIG. 11A illustrates a perspective view diagram of an embodiment of an example second over-mold section of the sealing boot encasing portion of the second cable about to be assembled into the shear bolt connector and the first over-mold section for a panel mount. FIG. 11B illustrates a side view diagram of an embodiment of an example second over-mold section of the sealing boot encasing portion of the second cable about to be assembled into the shear bolt connector and the first over-mold section for a panel mount.

The first over-mold section 100 for the panel mount (encasing a portion the cable and a first section of the shear bolt connector) can act as the female connector and a second over-mold section 150 of the sealing boot that covers a portion of the second cable and the second section of the shear bolt connector, can act as the male connector. The first over-mold section 100 for the panel mount mechanically secures to the second over-mold section 150 of the sealing boot, which ensures that the electrical connection of the first wire to the second wire electrically coupled through the shear bolt connector will be maintained. (See FIGS. 12A and 12B) FIG. 12A illustrates a perspective view diagram of an embodiment of an example second over-mold section of the sealing boot with a portion of the second cable assembled into the shear bolt connector and the first over-mold section for a panel mount. FIG. 12B illustrates a side view diagram of an embodiment of an example second over-mold section of the sealing boot with a portion of the second cable assembled into the shear bolt connector and the first over-mold section for a panel mount.

Referring back to FIG. 5, the first over-mold section 100 can include a first portion to cover parts of the first cable that are not passed through the metal frame. The first portion of the first over-mold section 100 for the panel mount is closer to the solar electrical inverter and covers the first cable. The first portion of the first over-mold section 100 may gradually taper from the metal frame towards the solar electrical inverter. The first portion of the first over-mold section 100 for the panel mount can be tapered for easier gripping. The first over-mold section 100 can include a permanently molded rubber panel mount bonded to the first cable and the shear bolt connector. The first over-mold section 100 can be extended onto and cover the first section of the shear bolt connector.

On a first end of the first over-mold section 100 is constructed in size and shape to fit over a location of a thin wall within a structure of the shear bolt connector, where the first over-mold section 100 can include a semi-circular curved recessed area, in such a way as to create a "nose" at the first end of the over-mold section. The "nose" can be located above the thin wall and the first hole of the first section of the shear bolt connector.

The first over-mold section 100 for the panel mount can further include a tapered section with a first end and a second end. The tapered section is extended between the end of the "nose" of the first over-mold section 100 (i.e., the first end) to about the area above the last (e.g., the third) hole of the first section of the shear bolt connector (i.e., the second end). A thickness of the first over-mold section 100 gradually increases from the first end to the second end.

Further, the portions of the first over-mold section 100 for the panel mount above the second end of the tapered section, can be extended horizontally above the second end, so that to create a protrusion area.

Referring to FIGS. 2 and 8, the second over-mold section 150 of the sealing boot can include a first portion to cover a portion of the second cable that is not to be inserted into the shear bolt connector. The first portion of the second over-mold section 150 may gradually taper from the second cable towards the shear bolt connector, in such a way that the first portion of the second over-mold section 150 that covers the second cable is slightly thinner that the first portion of the second over-mold section 150 that covers the shear bolt connector. The first portion of the second over-mold section 150 can be tapered for easier gripping. The second over-mold section 150 of the sealing boot can include a permanently molded rubber panel mount bonded to the second cable and the shear bolt connector. The second over-mold section 150 can be extended to cover the second section of the shear bolt connector.

The second over-mold section 150 can have a shape and size to slidably fit, for example compression fit, the first over-mold section 100. To that end, the second over-mold section 150 includes a semi-circular, curved protruded area. The second over-mold section 150 of the sealing boot includes a semi-circular, curved protruded area that creates a partial "ball" shape. The curved protruded area is constructed in size and shape to fit the semi-circular curved recessed area ("nose") of the first over-mold section 100. Once the second over-mold section 150 fully is slid far enough onto the first over-mold section 100 for the panel mount, the curved protruded area will mechanically connect and lock into the semi-circular curved recessed area ("nose") of the first over-mold section 100 at a location substantially above the thin wall and a first bolt hole of the first section of the shear bolt connector.

The second over-mold section 150 can further include a tapered section with a first end and a second end. The tapered section is extended between the end of the "ball" of the second over-mold section 150 (i.e., the first end) to about the area above the last (e.g., the third) hole of the first section of the shear bolt connector (i.e., the second end). A thickness of the second over-mold section 150 gradually decreases from the first end to the second end. The tapered section of the second over-mold section 150 can fit the tapered portion of the first over-mold section 100.

Further, the portions of the second over-mold section 150 of the sealing boot above the second end of the tapered section can be removed horizontally above the second end, so that to create a recessed section. The recessed section of the second over-mold section 150 can fit the protruded portion of the first over-mold section 100.

The first over-mold section 100 and the second over-mold section 150 are so configured that once fully connected, the resulted sealing boot includes multiple seals for watertight connection. The first over-mold section 100 and the second over-mold section 150 can include multiple additional water-tight seals, a second water-tight seal is created by a length and angle of taper of an outer surface of the first over-mold section 100 is mirrored in the inverse by an inner surface of the second over-mold section 150 that slides over the first over-mold section 100 and is located between a first bolt hole of the first section of the shear bolt connector and a last bolt hole of the shear bolt connector, i.e., the tapered area seal. For example, the first over-mold section 100 and the second over-mold section 150 can include a first seal above the first hole of the first section of the shear bolt connector, i.e., the "nose" and "ball" seal. Similarly, the first over-mold section 100 and the second over-mold section 150 can include a second seal between the first hole of the first section of the shear bolt connector and the last hole of the shear bolt connector, i.e., the tapered area seal. Additionally, the first over-mold section 100 and the second over-mold section 150 can include a third seal above the last hole of the first section of the shear bolt connector, i.e., the protruded area of the first over-mold section 100 and the recessed area of the second over-mold section 150. Thus, the first over-mold section 100 and the second over-mold section 150 can include a third seal above the last hole of the first section of the shear bolt connector, i.e., where a tongue and grove protruded area of the first over-mold section 100 receives a recessed lip area of the second over-mold section 150.

Further, the "nose" of the first over-mold section 100 and the "ball" of the second over-mold section 150 can mate together to form a quick, tool-free installation of the sealing boot. That is, the "ball-nose" connection forms a mating feature that can enable quick, tool-free installation of the toe parts of the sealing boot, i.e., the first over-mold section 100 and the second over-mold section 150.

In various embodiments, the first over-mold section 100 and the second over-mold section 150 are made of the same material. Alternatively, in some embodiments, the first over-mold section 100 and the second over-mold section 150 are made of different materials.

The interior surface of the second over-mold section 150 in a tapered portion that merely covers the second cable has a set of O-rings that slide over the second cable and form a watertight seal. The set of O-rings can be integrally molded inside the second over-mold section 150. Further, the set of O-rings can be used to enhance the strain relief for the assembled sealing boot.

In some embodiments, the second over-mold section 150 may include a set of protrusions, over the outer surface of the second over-mold section 150. The surface of the second over-mold section 150 may include a set of protrusions integrated into the second over-mold section 150 over an outer surface of the second over-mold section 150, where the set of protrusions is constructed in size and shape as well as distance spacing between the set of protrusions to form a set of gripping ribs for a person's hand and fingers that function to facilitate a sliding of the sealing boot over a tapered section of the first over-mold section 100 when installing and mechanically locking the second over-mold section 150 to the first over-mold section 100.

FIG. 13 illustrates a perspective view diagram of an embodiment of an example second over-mold section of the sealing boot mechanically locked with the first over-mold section. The second over-mold section 150 of the sealing boot is configured to encase a portion of a second cable and a second section of the shear bolt connector, where the second cable is electrically connected to a DC voltage feed to be supplied to the electrical inverter. Once the first over-mold section 100 and the second over-mold section 150 are fully connected to form the sealing boot, the sealing boot can be a single-piece, watertight assembly that covers the entire shear bolt connector and the portions of the first and second cables that are inside the shear bolt connector.

The electrical inverter is a solar-powered electrical inverter; and thus, the first over-mold section 100 for the panel mount and the second over-mold section 150 are made of weather resistant material.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed.

Further, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive. As this invention is susceptible to embodiments of many different forms, it is intended that the present disclosure is to be considered as an example of the principles of the invention and not intended to limit the invention to the specific embodiments shown and described.

What is claimed is:

1. An apparatus, comprising:

a first over-mold section for a panel mount, a sealing boot with a second over-mold section, where the first over-mold section for the panel mount is configured to encase a portion of a first cable and a first section of a shear bolt connector to form a panel mount receptacle, where the first cable is configured to be electrically connected to an electrical inverter, where the second over-mold section of the sealing boot is configured to encase a portion of a second cable and a second section of the shear bolt connector, where the second cable is configured to be electrically connected to a DC voltage feed to be supplied to the electrical inverter, and where the second over-mold section is configured to have a shape and size to slidably fit over the first over-mold section to form a mechanically locked, watertight assembly that covers the shear bolt connector in its entirety and the portions of the first cable and the second cable that are electrically coupled inside the shear bolt connector, where a surface of the second over-mold section is configured to have a set of protrusions integrated into the second over-mold section over an outer surface of the second over-mold section, where the set of protrusions is constructed in size and shape as well as distance spacing between the set of protrusions to form a set of gripping ribs for a person's hand and fingers that function to facilitate a sliding of the sealing boot over a tapered section of the first over-mold section when installing and mechanically locking the second over-mold section to the first over-mold section.

2. The apparatus of claim 1, where the first over-mold section for the panel mount is configured to have multiple holes in a flange of the first over-mold section that allow bolts to pass through so that the first over-mold section for the panel mount can be bolted to a metal frame to form a panel mount.

3. The apparatus of claim 1, where a first end of the first over-mold section is constructed in size and shape to fit over the shear bolt connector, where the first over-mold section can include a semi-circular curved recessed area, in such a way as to create a nose ring at the first end of the first over-mold section.

4. The apparatus of claim 3, where the second over-mold section of the sealing boot is configured to have a semi-circular, curved protruded area that creates a partial ball shape, where the curved protruded area is constructed in size and shape to fit the semi-circular curved recessed area of the first over-mold section, and once the second over-mold section fully is slid far enough onto the first over-mold section for the panel mount, the curved protruded area will mechanically connect and lock into the semi-circular curved recessed area of the first over-mold section.

5. The apparatus of claim 1, where an interior surface of the second over-mold section in a tapered portion that merely covers the second cable is configured to have a set of O-rings that slide over the second cable and form a water-tight seal.

6. The apparatus of claim 1, where the first over-mold section and the second over-mold section is configured to have multiple water-tight seals, where a first water-tight seal is configured to be created by a length and angle of taper of an outer surface of the first over-mold section which is mirrored in an inverse by an inner surface of the second over-mold section that slides over the first over-mold section and is located between a first bolt hole of the first section of the shear bolt connector and a last bolt hole of the shear bolt connector.

7. The apparatus of claim 1, where the first over-mold section and the second over-mold section are configured to create a watertight seal above the first section of the shear bolt connector where a tongue and grove protruded area of the first over-mold section receives a recessed lip area of the second over-mold section.

8. The apparatus of claim 1, where the first over-mold section for the panel mount is configured to have a hollow interior in order to slide over the first cable coming from the electrical inverter when being installed and then slide back over the first cable and the first section of the shear bolt connector after they have been mechanically and electrically secure together, where the electrical inverter is a solar-powered electrical inverter; and thus, the first over-mold section for the panel mount is made of weather resistant material.

9. The apparatus of claim 1, where the second over-mold section of the sealing boot is configured to have a hollow interior in order to slide over the second cable coming from the DC voltage feed when being installed and then slide back over the second cable and the second section of the shear bolt connector after they have been mechanically and electrically secure together, where the DC voltage feed comes from a solar-powered array; and thus, the second over-mold section is made of weather resistant material.

10. A method of electrically connecting a DC voltage feed to an electrical inverter, comprising:

providing a first over-mold section for the panel mount to encase a portion of a first cable and a first section of a shear bolt connector to form a panel mount receptacle, where the first cable is configured to be electrically connected to an electrical inverter, providing a second over-mold section of a sealing boot to encase a portion of a second cable and a second section of the shear bolt connector, where the second cable is configured to be electrically connected to a DC voltage feed to be supplied to the electrical inverter, and providing the second over-mold section to have a shape and size to slidably fit over the first over-mold section to form a mechanically locked, watertight assembly that covers the shear bolt connector in its entirety and the portions of the first cable and the second cable that are electrically coupled inside the shear bolt connector; and providing a surface of the second over-mold section to have a set of protrusions integrated into the second over-mold section over an outer surface of the second over-mold section, where the set of protrusions is constructed in size and shape as well as distance spacing between the set of protrusions to form a set of gripping ribs for a person's hand and fingers that function to facilitate a sliding of the sealing boot over a tapered section of the first over-mold section when installing and mechanically locking the second over-mold section to the first over-mold section.

11. The method of claim 10, further comprising:

providing the first over-mold section for the panel mount to have multiple holes in a flange of the first over-mold section that allow bolts to pass through so that the first over-mold section for the panel mount can be bolted to a metal frame to form a panel mount.

12. The method of claim 10, further comprising:

providing a first end of the first over-mold section constructed in size and shape to fit over the shear bolt connector, where the first over-mold section can include a semi-circular curved recessed area, in such a way as to create a nose ring at the first end of the over-mold section.

13. The method of claim 12, further comprising:

providing the second over-mold section of the sealing boot to have a semi-circular, curved protruded area that creates a partial ball shape, where the curved protruded area is constructed in size and shape to fit the semi-circular curved recessed area of the first over-mold section, and once the second over-mold section fully is slid far enough onto the first over-mold section for the panel mount, the curved protruded area will mechanically connect and lock into the semi-circular curved recessed area of the first over-mold section.

14. The method of claim 10, further comprising:

providing an interior surface of the second over-mold section in a tapered portion that merely covers the second cable to have a set of O-rings that slide over the second cable and form a watertight seal.

15. The method of claim 10, further comprising:

providing the first over-mold section and the second over-mold section to have multiple water-tight seals, where a first water-tight seal is configured to be created by a length and angle of taper of an outer surface of the first over-mold section which is mirrored in an inverse by an inner surface of the second over-mold section that slides over the first over-mold section and is located between a first bolt hole of the first section of the shear bolt connector and a last bolt hole of the shear bolt connector.

16. The method of claim 10, further comprising:

providing the first over-mold section and the second over-mold section to create a watertight seal above the first section of the shear bolt connector where a tongue and grove protruded area of the first over-mold section receives a recessed lip area of the second over-mold section.

17. The method of claim 10, further comprising:

providing the first over-mold section for the panel mount to have a hollow interior in order to slide over the first cable coming from the electrical inverter when being installed and then slide back over the first cable and the first section of the shear bolt connector after they have been mechanically and electrically secure together, where the electrical inverter is a solar-powered electrical inverter; and thus, the first over-mold section for the panel mount is made of weather resistant material.

18. The method of claim 10, further comprising:

providing the second over-mold section of the sealing boot to have a hollow interior in order to slide over the second cable coming from the DC voltage feed when being installed and then slide back over the second cable and the second section of the shear bolt connector after they have been mechanically and electrically secure together.

19. An apparatus, comprising:

a first over-mold section being part of a panel mount, wherein the first over-mold section is configured to encase a portion of a first cable and a first section of a shear bolt connector to form a panel mount receptacle; and a second over-mold section being part of a sealing boot, wherein the second over-mold section is configured to encase a portion of a second cable and a second section of the shear bolt connector, wherein the second over-mold section is configured to have a shape and size to slidably fit over the first over-mold section to form a mechanically locked, watertight assembly that covers the shear bolt connector in its entirety and the portions of the first cable and the second cable that are electrically coupled inside the shear bolt connector, and wherein an interior surface of the second over-mold section in a tapered portion adapted to cover the second cable is configured with a set of O-rings that slide over the second cable and form a watertight seal.

20. The apparatus of claim 19, where a surface of the second over-mold section to have a set of protrusions integrated into the second over-mold section over an outer surface of the second over-mold section, where the set of protrusions is constructed in size and shape as well as distance spacing between the set of protrusions to form a set of gripping ribs for a person's hand and fingers that function to facilitate a sliding of the sealing boot over a tapered section of the first over-mold section when installing and mechanically locking the second over-mold section to the first over-mold section.

* * * * *